United States Patent
Granberg

(12) 
(10) Patent No.: US 6,195,543 B1
(45) Date of Patent: Feb. 27, 2001

(54) METHOD AND APPARATUS FOR PROVIDING ADVICE OF CHARGE PARAMETERS FOR MOBILE RADIO TELEPHONE CALLS

(75) Inventor: Christer Granberg, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/088,094

(22) Filed: Jun. 1, 1998

Related U.S. Application Data

(60) Provisional application No. 60/050,258, filed on Jun. 20, 1997.

(51) Int. Cl.[7] .................................................. H04M 11/00
(52) U.S. Cl. .................... 455/407; 455/408; 455/406; 455/432; 379/114; 379/121; 379/130
(58) Field of Search .................... 455/408, 407, 455/406, 405, 433, 432, 560; 379/114, 130, 131, 112, 121

(56) References Cited

U.S. PATENT DOCUMENTS

| | | | |
|---|---|---|---|
| 5,003,584 | * 3/1991 | Benyacar et al. | 379/119 |
| 5,303,297 | * 4/1994 | Hillis | 455/406 |
| 5,577,100 | * 11/1996 | McGregor et al. | 455/406 |
| 5,592,535 | 1/1997 | Klotz | 455/406 |
| 5,748,720 | * 5/1998 | Loder | 455/407 |
| 5,828,738 | * 10/1998 | Spaeth | 455/407 |
| 6,002,755 | * 12/1999 | Krank et al. | 379/114 |

FOREIGN PATENT DOCUMENTS

| | | |
|---|---|---|
| 195 15 418 | 10/1996 | (DE) . |
| 0 647 055 | 4/1995 | (EP) . |
| 0 734 144 | 9/1996 | (EP) . |
| 0 751 662 | 1/1997 | (EP) . |
| WO 94/28670 | * 12/1994 | (WO) . |
| 95/20298 | 7/1995 | (WO) . |

OTHER PUBLICATIONS

Global System for Mobile Communications Technical Specification, GSM 02.86, Nov. 1996, Version 5.0.0, Digital cellular telecommunications system; Advice of Charge (AoC) Supplementary Services—Stage 1 (GSM 02.86), European Telecommunications Standards Institute.

Global System for Mobile Communications Technical Specification, Draft prETS 300 935, Dec. 1996, Digital cellular telecommunications system: Advice of Charge (AoC) Supplementary Services—Stage 2 (GSM 03.86 version 5.0.0) European Telecommunications Standards Institute.

Global System for Mobile Communications Technical Specification, GSM 03.78, Apr. 1997, Version 5.0.0, Digital cellular telecommunications system (Phase 2+); Customized Applications for Mobile network Enhanced Logic (CAMEL)—Stage 2 (GSM 03.78), European Telecommunications Standards Institute.

* cited by examiner

Primary Examiner—Reinhard J. Eisenzopf
Assistant Examiner—Eliseo Ramos-Feliciano
(74) Attorney, Agent, or Firm—Nixon & Vanderhye, P.C.

(57) ABSTRACT

A control point administers an Advice of Charge (AoC) service provided to mobile subscribers. The control point is informed of each can involving a mobile station that subscribes to the Advice of Charge service. The control point determines one or more AoC parameters for the call and sends them to a switching node currently serving the mobile station. The mobile station receives the AoC parameters from the serving switching node and determines a prospective cost associated with the call and displays that cost to the mobile subscriber. Accumulated costs for that call may also be determined and displayed during the call.

28 Claims, 4 Drawing Sheets

METHOD AND APPARATUS FOR PROVIDING ADVICE OF CHARGE PARAMETERS FOR MOBILE RADIO TELEPHONE CALLS

This application claims priority from U.S. Provisional Patent Application Serial No. 60/050,258, filed on Jun. 20, 1997.

FIELD OF THE INVENTION

The present invention relates to customized applications for mobile networks such as digital cellular radio telecommunications systems. More particularly, the present invention relates to an Advice of Charge (AoC) service for mobile telephone subscribers.

BACKGROUND AND SUMMARY OF THE INVENTION

In mobile radio communication networks, such as cellular telephone systems, neighboring radio cells provide coverage of a geographical area to be serviced. Each cell has a base station (BS) operating on a set of radio channels over which mobile subscribers communicate. A mobile switching center (MSC) controls calls between a group of base stations and various networks, e.g., the public switched telephone network (PSTN), integrated services digital network (ISDN), and one or more public land mobile radio networks (PLMN). The MSC performs functions such as call switching, routing, and charging.

All mobile communication networks provide the "basic call services" required for making and receiving calls in home and in foreign (hereinafter referred to as "visiting") mobile communication networks. In fact, known cellular systems like the Nordic Mobile Telephone System (NMT), the Total Access Communication System (TACS), the American Digital Cellular System (ADC), the Global System for Mobile Communication (GSM), and the Pacific Digital Cellular System (PDC) have adopted standardized techniques for providing such basic services. Basic services include calls to/from individual mobile subscribers and other services available to all mobile subscribers that do not require an individual service subscription.

In the fixed telephony network, intelligent networks (IN) were developed to provide additional, more flexible services to supplement existing telephony services. More recently, IN-based services have also become necessary and/or desirable in mobile telecommunications networks to provide supplementary services. Supplementary mobile services generally require an individual subscription and example supplementary services are call waiting, call forwarding, and call barring. Supplementary subscriber services may be divided into two types: (1) those which modify or supplement the process of "originating" a call, and (2) those which modify or supplement the process of "terminating" a call. Examples of originating supplementary services include: barring of outgoing calls and closed user group. Examples of terminating supplementary services include: barring incoming calls, call forwarding, and call waiting.

In the example of a GSM mobile communications system, (adopted for purposes of explanation and not limitation), efforts have been made to develop Intelligent Network (IN) capabilities for mobile network operators in the Customized Applications for Mobile Network Enhanced Logic (CAMEL) standard published by the European Telecommunications Standards Institute (ETSI) as GSM Technical Specification 03.78. The goal of the CAMEL standardization process is to provide mobile network operators with the capability to quickly design and offer new and enhanced mobile network-specific services using intelligent network type tools, e.g., service logic building blocks, service databases, service "trigger" or "detection" points, etc. For example, a service control point (SCP) node stores and implements service logic invoked to provide supplementary services. A service switching point (SSP) node handles service detection and switching functions necessary to invoke services at the SCP. However, to reconcile the mobility of the subscribers in this IN framework, functions performed by the HLR, the SCP, and the MSC must be coordinated.

In order to provide IN-based, network-specific services to mobile subscribers, network-specific service subscription information, (referred to in the GSM CAMEL example as CAMEL Subscription Information (CSI)), must be stored in the subscriber record for each mobile subscriber. In CAMEL, such services to be invoked at the origination of a call from a mobile subscriber are indicated with originating-CSI (O-CSI), and CAMEL services to be invoked for a terminating call to a mobile subscriber are indicated with terminating-CSI (T-CSI).

When a mobile subscriber leaves its home mobile communication network and registers at a visiting mobile communications network, that mobile subscriber's O-CSI must be sent from the HLR to the visiting mobile communications network as part of the typical mobile subscriber location update procedure. The O-CSI is stored at the visiting location register (VLR) database serving the area in which the mobile subscriber is currently located. Thereafter, when that mobile subscriber initiates or forwards a call, the visiting network MSC/VLR detects the O-CSI stored for that subscriber in the VLR. In effect, the O-CSI functions as a Detection Point (similar to an IN "trigger" point in fixed telephony networks) in the call processing which causes a transfer of control to the Service Control Point (SCP). The T-CSI also functions as a detection point in the call processing for incoming calls to the mobile station.

The present invention is directed to a supplementary service referred to in this application as an Advice of Charge (AoC) service. The AoC supplementary service notifies mobile telephone subscribers of the charge for a prospective originating or terminating call before the charges have occurred. In addition, the Advise of Charge service may also notify the mobile subscriber of total or accumulated charges for an ongoing call.

In the example GSM system, "E-parameters" may be used as AoC parameters from which the prospective costs and accumulated costs of a call can be calculated within the mobile terminal. Calculation of AoC parameters may be accomplished by performing tariff/charging analysis in each mobile switching node, e.g., the mobile switching center (MSC). However, there are problems with this approach. First, mobile switching nodes like MSCs generally do not perform tariff and charging analyses. But if all MSCs were programmed to perform charging and tariff analysis operations, this would add a significant administrative burden both for the MSCs and for the mobile network operators. Each mobile network operator would be required to provide charging and tariff information to all of the MSC nodes within the home network for each mobile subscriber. Moreover, the mobile network operator would have to update continuously in each MSC the charging and tariffing functions and parameters whenever they changed for each mobile station, e.g., mobile subscribers are added or deleted, mobile subscribers change their subscriptions, new discount pricing structures for various time periods, etc. Further, in order to be effective over a wide, inter-network coverage area, each MSC would require an enormous database to track charging for all mobile stations within its home network as well as all roaming mobile stations that might visit that network.

Another problem with this approach concerns a roaming mobile subscriber currently being served in a visiting network by a visiting MSC where the roaming mobile subscriber is to receive a call. In this instance, it is impossible for the visiting MSC currently serving the roaming mobile to calculate the total cost of the incoming call. Only the home mobile network operator has all of the billing information required to determine how much all portions of and services for the call will cost. For example, the visiting MSC will not know the cost(s) associated with the roaming leg of the call. Without an accurate total cost or projected cost of a call to a roaming mobile, the visiting MSCs cannot provide an AoC service. While it might be possible in theory for operators to exchange charging/billing information for all mobile subscribers, such an exchange would create an enormous administrative burden requiring huge databases and database updates.

It is an object of the present invention to overcome these difficulties and problems.

It is an object of the present invention to provide an Advice of Charge service to mobile subscribers for both mobile originating and mobile terminating calls.

It is a further object of the present invention to provide such Advice of Charge services efficiently to mobile subscribers located in their home mobile network as well as when they are roaming in visiting mobile networks without burdening mobile switching centers with administrative tasks associated with charging.

The present invention employs a central control point that administers an Advice of Charge (AoC) service provided to mobile subscribers. The control point is informed of each call involving a mobile that subscribes to the Advice of Charge service. The control point determines one or more AoC parameters for the call and sends them to the switching node currently serving the mobile subscriber. The mobile station receives the AoC parameters from the serving switching node and determines a prospective cost associated with the call and displays that cost to the mobile subscriber. Accumulated costs for that call may also be determined and displayed during the call.

Accordingly, the central control point performs the charging analysis for the mobile subscriber to determine the AoC parameters rather than a serving Mobile Switching Center (MSC). In a GSM example implementation, when a call is originated from the mobile, the MSC determines whether the mobile subscriber has a service controlled by a central control point, and if so, informs the control point of the call as well as its identity as the serving MSC. The control point then sends the AoC parameters for the call to the serving MSC, and the MSC forwards those parameters to the mobile.

In the opposite direction, when a call terminates at the mobile, the call is initially processed at a Gateway Mobile Switching Center (GMSC). Based on information from a home location register (HLR) database, the GMSC determines the mobile subscriber service and identifies the MSC currently serving that mobile subscriber. The GMSC informs the control point of the identity of the mobile subscriber and the serving MSC. The control point sends the determined AoC parameters to the serving MSC which forwards them to the mobile subscriber.

During a call, there may be a change in charging condition. If that is the case, the control point then determines new Advice of Charge parameters to account for the change in charging condition and sends those new AoC parameters to the mobile. The mobile then recalculates and displays the cost of the call to the mobile subscriber.

A preferred but nevertheless example embodiment of the present invention is disclosed in the context of a GSM mobile communications system which implements the Advice of Charge supplementary service using CAMEL/IN functionalities. A Service Switching Functionality (SSF) incorporated into the MSCs and GMSCs is used to detect when an Advice of Charge service should be invoked for a particular call. The Advice of Charge service is then administered under the control of a Service Control Point (SCP).

BRIEF DESCRIPTION OF THE DRAWINGS

The foregoing and other objects, features, and advantages of the invention will be apparent from the following description of preferred embodiments as illustrated in the accompanying drawings in which reference characters refer to the same parts throughout the various views. The drawings are not necessarily to scale. Emphasis instead being placed upon illustrating the principles of the invention.

DETAILED DESCRIPTION OF THE DRAWINGS

In the following description, for purposes of explanation and not limitation, specific details are set forth, such as particular embodiments, data flows, signaling implementations, interfaces, techniques, etc. in order to provide a thorough understanding of the present invention. However, it will be apparent to one skilled in the art that the present invention may be practiced in other embodiments that depart from these specific details. For example, while the present invention is sometimes described in the context of an example cellular telephone network using GSM and CAMEL terminology, those skilled in the art will appreciate that the present invention can be implemented in any cellular telephone system using a variety of methods for implementing supplemental mobile services. In other instances, detailed descriptions of well-known methods, interfaces, devices, and signaling techniques are omitted so as not to obscure the description of the present invention with unnecessary detail.

Figure 1:
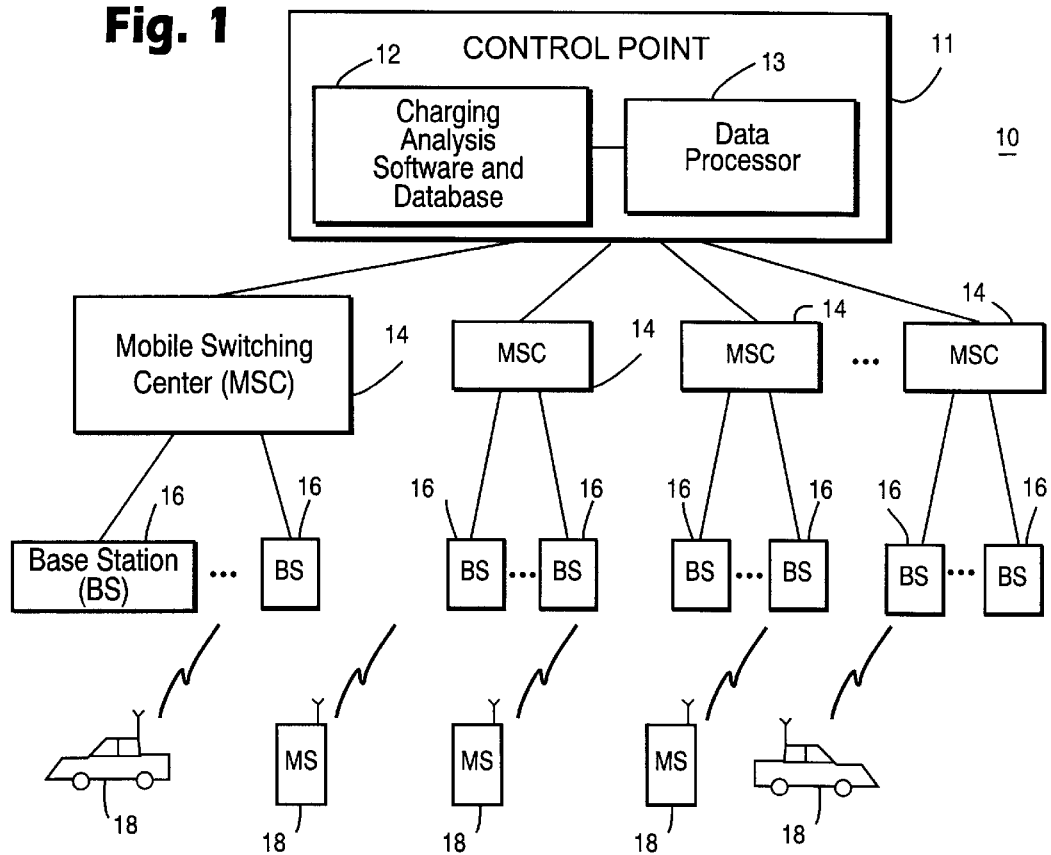
FIG. 1 is a function block diagram of a mobile communications system in which the present invention is incorporated.

An example mobile communications system 10 in which the present invention may be employed in a first example embodiment of the present invention is now described in conjunction with FIG. 1. A central control point 11 is coupled to multiple Mobile Switching Centers (MSCs) 14. These MSCs 14 may be provided in different mobile communication networks operated by different network operators. Each mobile switching center 14 is connected to a plurality of Base Stations (BSs) 16. Radio communications are effected between the base station and various Mobile Stations (MSs) 18 which include portable radios as well as mobile radios mounted in vehicles. Each mobile station subscribes to a home mobile network but is generally permitted to roam outside of its home network to visiting mobile networks. The mobile switching center at which a mobile station is currently registered is referred to as the serving mobile switching center (serving MSC).

The central control point 11 includes a data processor 13 as well as charging and traffic analysis software and database 12. The charging analysis software includes program instructions, and the database stores tariff information utilized by the data processor 13 to determine one or more Advice of Charge parameters related to the cost associated with a particular call involving a mobile station (assuming that the owner/user of the mobile station subscribes to an Advice of Charge service).

Figure 2:
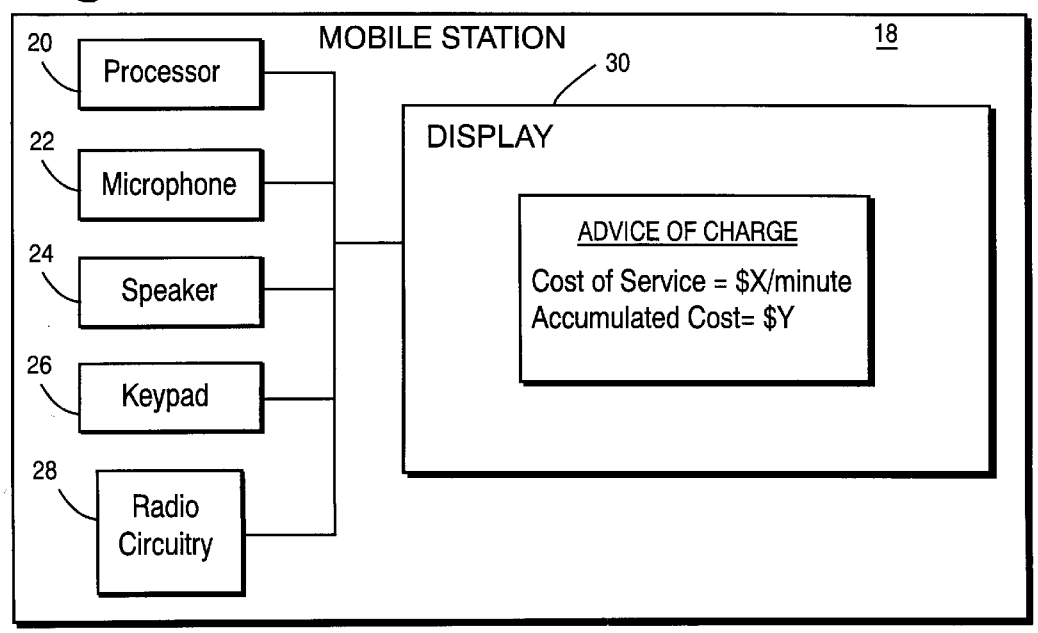
FIG. 2 is a function block diagram showing various elements of a mobile station or terminal.

FIG. 2 illustrates some of the well-known elements of an example mobile station 18 including data processing circuitry 20, a microphone 22, a speaker 24, a keypad 26, radio circuitry 28, and a display 30. Processing circuitry 20 calculates a prospective cost of service for a call involved in the mobile station and preferably also calculates an accumulated call cost during the call based on one or more Advice of Charge service parameters communicated to the mobile station. The cost of service and/or accumulated cost are displayed on the display 30 or indicated in any suitable format to apprise the mobile operator of these costs.

Figure 3:
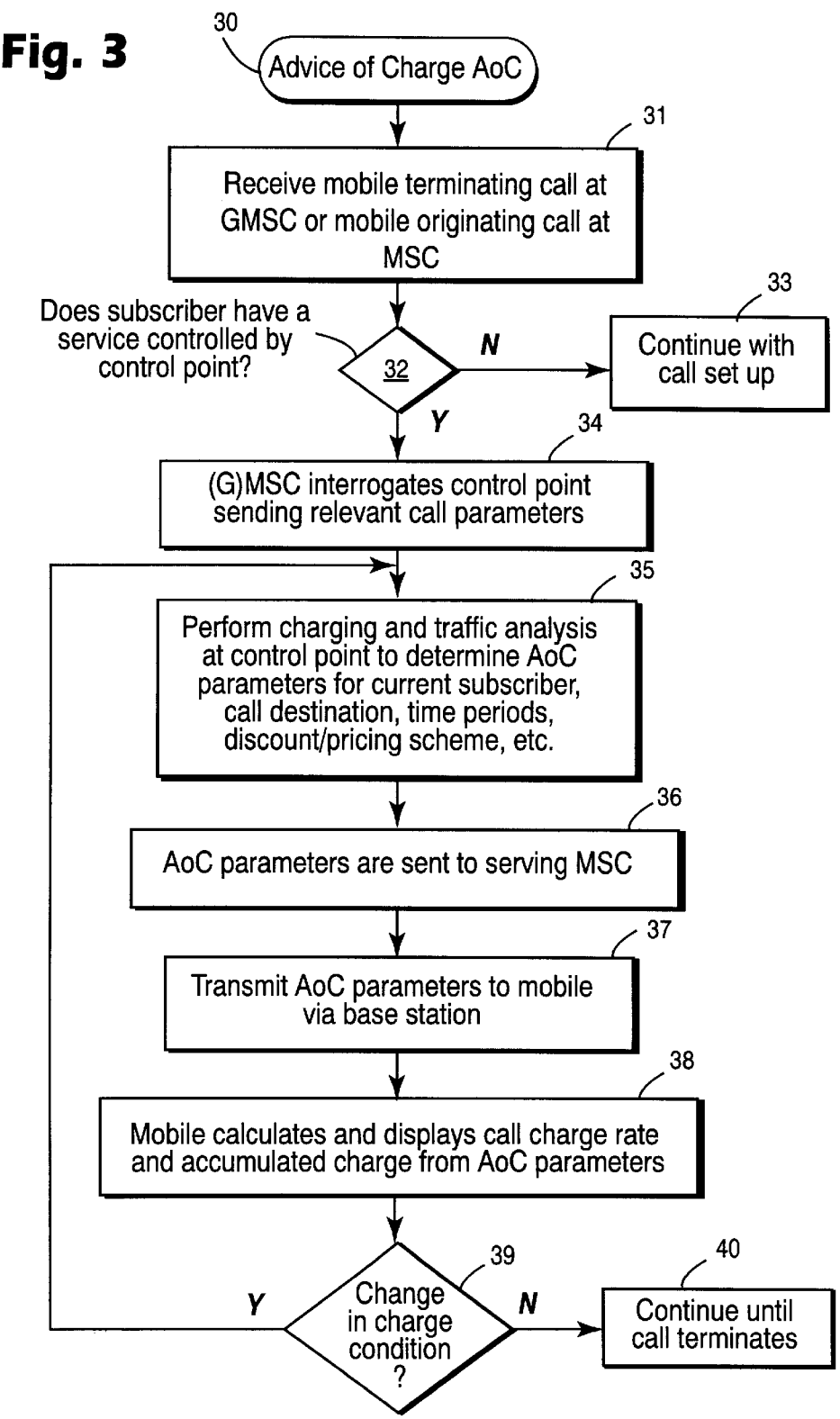
FIG. 3 is a flowchart diagram illustrating Advice of Charge procedures in accordance with a preferred example embodiment of the present invention.

Example procedures (Advice of Charge (AoC) routine 30) for implementing the Advice of Charge service in accordance with the first preferred example embodiment of the present invention are now described in conjunction with the flowchart shown in FIG. 3. The procedures assume that a mobile call, either originating from a mobile terminal or terminating at a mobile terminal, is received at a serving mobile switching center (MSC) or other switching node in the course of setting up a call connection with that mobile terminal (block 31). A decision is made in block 32 whether the mobile subscriber has a service controlled by a central control point 11. If not, call setup continues in the usual fashion (block 33). If the MSC determines that the mobile has a service controlled by the central control point 22, it informs the central control point of the call, the mobile subscriber's identification, and an identification or address of the mobile switching center currently serving that mobile subscriber (block 34).

The central control point 11 performs a charging and traffic analysis to determine Advice of Charge parameters for the call using mobile subscriber identity, the call destination, time periods, (e.g., time of day, day of week, holiday, etc.), discount pricing schemes, etc. (block 35). The determined Advice of Charge parameters for this call are then provided to the serving MSC (block 36). The serving MSC sends the determined Advice of Charge parameters to the serving base station in whose corresponding cell/geographical service area the mobile subscriber is currently located (block 37). Having received the AoC parameters over a radio channel from the serving base station, the mobile terminal calculates and displays a call charge rate and/or accumulated charge using the received AoC parameters (block 38).

A decision is then made in block 39 whether there has been a change in charging condition. For example, the call may have taken place during business hours but then continues over to non-business hours resulting in a reduced call rate. If that is the case, control returns to block 35 to repeat the procedures outlined in blocks 35–38 using new AoC parameters.

Otherwise, the calculation display of call charge rate and/or accumulated charge preferably continues until the call terminates (block 40).

The central control point 11 performs the administrative charging and tariff analysis functions required for the AoC service so that the individual mobile switching centers 14 are not each burdened with such tasks. Instead, each mobile switching center simply conveys AoC parameter information to and from the control point so that Advice of Charge service subscribers obtain the necessary information for calculating and displaying the charge associated with prospective or ongoing call. Therefore, any subscription and charging updates and other changes can be centrally determined and centrally administered.

Figure 4:
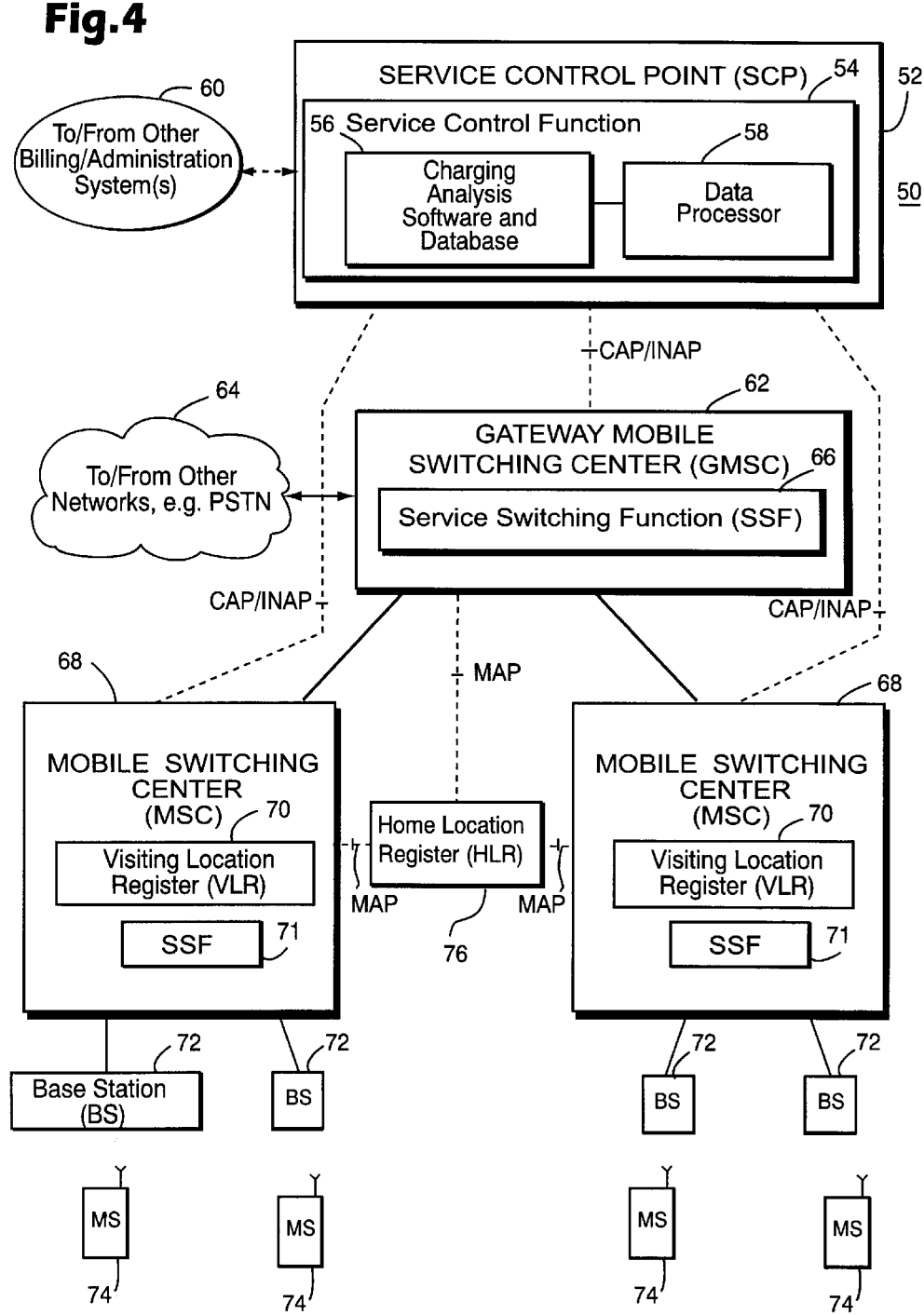
FIG. 4 is a function block diagram illustrating a GSM mobile communications system in which the present invention may be implemented in accordance with a second preferred example embodiment of the present invention.

A second example embodiment of the present invention is now described in the context of a GSM-based mobile communications system 10 shown in FIG. 4. Dashed lines indicate signaling, and solid lines indicate traffic. A Gateway Mobile Switching Center (GMSC) 62 interfaces with other telecommunications networks 64 such as the Public Switched Telephone Network (PSTN), Integrated Services Digital Network (ISDN), or other cellular networks. The gateway mobile switching center 62 connects to one or more mobile switching centers (MSC) 68. The gateway MSC 62 is the interface point in the mobile radio network for calls to mobile subscribers. Although the GMSC 62 is shown as a separate node for clarity of illustration, it can be co-located with an MSC node.

Each mobile switching center 68 performs telephony switching functions associated with calls involving a mobile station (MS) 74 including interfacing with other telecommunications networks and routing mobile-originated calls. Each mobile switching center 28 is associated with a Visiting Location Register (VLR) 70 which includes a database containing the information about all mobile stations currently located in a corresponding location or service area. The VLR 70 contains temporary subscriber information needed by the MSC 68 to provide services to mobile stations in its service area. Typically, when a mobile station 74 enters a visiting network or service area, the corresponding VLR requests and receives data (using a Mobile Application Part (MAP) protocol) about the roaming mobile station 74 from the mobile's home location register 76 and stores it. As a result, when the visiting mobile station is involved in a call, the VLR already has the information needed for call set up. While the visiting location register 70 may be a stand-alone node, the VLR is preferably integrated with its associated MSC to eliminate signaling between the two nodes.

The Home Location Register (HLR) 76 is a database node that stores and manages subscriptions. For each "home" mobile subscriber, the HLR 76 contains permanent subscriber data such as the Mobile Station ISDN Number (MSISDN) which uniquely identifies the mobile telephone subscription in the PSTN numbering plan and an International Mobile Subscriber Identity (IMSI) which is a unique identity allocated to each subscriber and used for signaling in the mobile networks. All network-related subscriber information is connected to the IMSI. The HLR 76 also contains a list of services which a mobile subscriber is authorized to use along with the current subscriber location number corresponding to the address of the VLR currently serving the mobile subscriber.

Once a serving MSC/VLR is identified (in the home or a visiting network), a call intended for the mobile station 74 is routed by that serving MSC/VLR to the base station 72 associated with the cell in which the called mobile station is currently located. Using well known, established protocols and procedures, the call is established over the radio interface between that base station 72 and the mobile station 74.

In this second example embodiment, the Advice of Charge service is provided to mobile subscribers using an intelligent network (IN) or an advanced intelligent network (AIN) type infrastructure and procedures model. The Customized Applications for Mobile network Enhanced Logic (CAMEL) described in the background is one such IN-based mechanism for providing supplementary services in addition to the basic telephony services in a GSM-based network. Accordingly, each MSC 60 and the GMSC 62 includes a functional entity called a service switching function (SSF) 66 and 71 that interfaces the MSC 68 and GMSC 62 to a service control point (SCP) 52.

The service switching functions 66 and 71 in the GMSC and MSC, respectively, are similar to the SSF used in fixed telephony IN but use different triggering mechanisms consistent with mobile communications networks. The points in the processing of a call at which service logic execution is necessary are triggered by detection points (DP). The service control point 52 includes a Service Control Function (SCF) 52 including service logic such as charging and traffic analysis software and database 56 and data processor 58 used in the AoC, CAMEL-constructed service. The HLR 76 communicates with the GMSC 62 and MSCs 68 using a Mobile Application Part (MAP) protocol. The SSFs 66 and 71 and the SCF 54 communicate using a CAMEL Application Part (CAP) protocol or an Intelligent Network Application Part (INAP) protocol.

Figure 5:
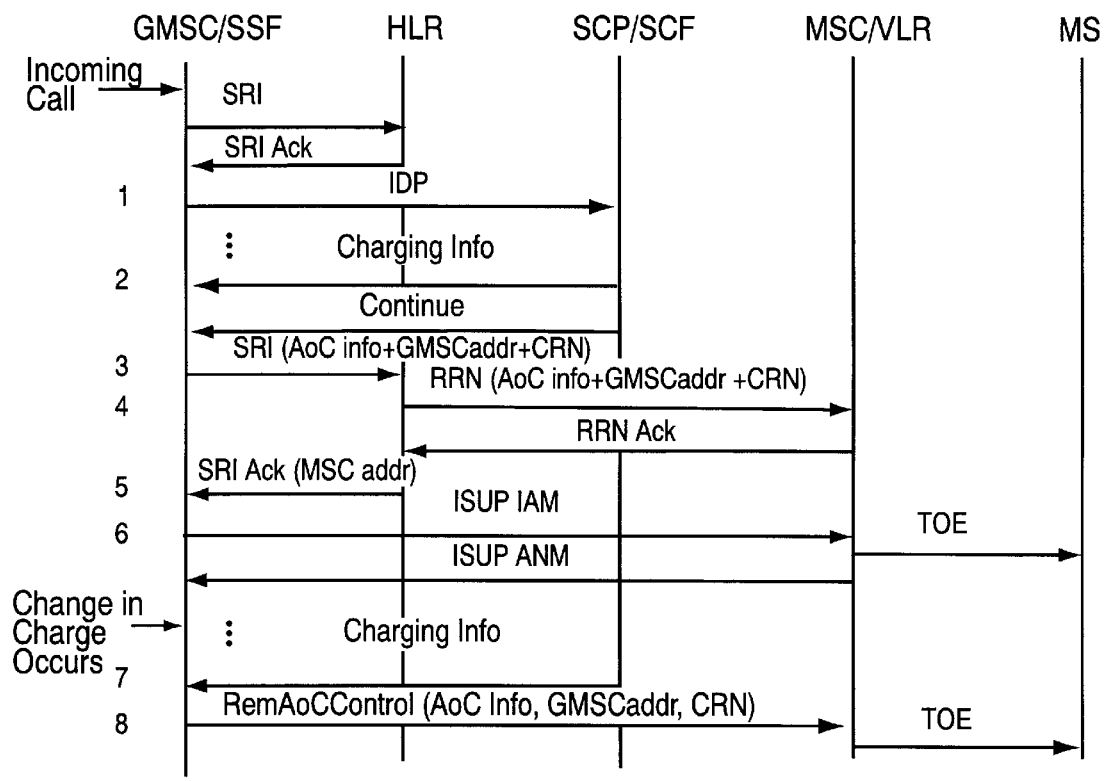
FIG. 5 is a signaling diagram illustrating example signaling procedures for implementing the Advice of Charge service in the GSM mobile communications system shown in FIG. 4 for a mobile terminating call in accordance with the second preferred example embodiment of the invention.

Reference is now made to the signaling flow diagram shown in FIG. 5 for description of the operation of the second example embodiment of the invention for an incoming call terminating at a mobile station subscribing to the Advice of Charge service. Initially, the incoming call is routed to the GMSC 62. The intelligent network functionality is invoked in this example embodiment by the service switching function (SSF) 66 in the GMSC 62. Specifically, the GMSC/SSF Sends a request for Routing Information (SRI) to the HLR 76 over the MAP interface. The SRI request contains the identity of the called mobile subscriber. The HLR 76 checks the stored data for the called mobile subscriber and determines that the called mobile subscriber subscribes to a terminating-IN (CAMEL) based service. Accordingly, the HLR sends an SRI acknowledgment indication (SRI Ack) to the GMSC/SSF that the IN functionality should be invoked for this call along with the address of the serving MSC 68 where the subscriber is currently registered. The address of the serving MSC is stored in the GMSC.

With the IN functionality invoked, the GMSC/SSF 66 sends an initial triggering detection point message (IDP) to the service control point 52. The IDP message contains the identity of the called mobile subscriber and the address of the serving MSC. The service control function 54 at the service control point 52 calculates the tariff for the call based on one or a combination of items such as the identity of the called mobile subscriber, the address of the serving MSC, the time, the day of week, and other relevant data. As one, non-limiting example, the SCF may determine and send a set of E-parameters as the Advice of Charge information. E-parameters may be configured as a series of seven tables E1–E7 which may be defined as follows: E1-units per interval table, E2-seconds per interval table, E3-scaling factor table, E4-unit increment table, E5-units per data interval table, E6-segments per data interval table, and E7-initial seconds per interval table.

The SCF 54 sends the calculated Advice of Charge information to the SSF 66 at the GMSC 62. The Advice of Charge (AoC) information may be sent as additional information in an existing message between the SCF and the SSF or as a new Send Charging (SC) message defined to carry the AoC information. In this example where the SCF sends the AoC 20 information as part of an IN charging information message, the SCF sends a Continue message which instructs the SSF to continue processing of the mobile terminating call.

The GMSC sends a second request for a roaming number (SRI) message to the HLR which includes the Advice of Charge information received from the SCF, the address of the GMSC, and a call reference number (CRN). The call reference number uniquely identifies the call and is stored in the GMSC for the call duration. The HLR forwards the information to the MSC/VLR in a request for roaming number (RRN) message. The MSC/VLR stores the received information together with the allocated roaming number. In response to the HLR's request for a roaming number, the HLR receives a roaming number from the serving MSC/VLR contained in an RRN acknowledgment message. The HLR then forwards the allocated roaming number to the GMSC in an acknowledgment message (SRI Ack) which includes the serving MSC's address as well as the roaming number.

The call is set up from the GMSC to the MSC/VLR using a signaling system number 7 (ISUP) Initial Address Message (IAM). When the call itself is received at the serving MSC/VLR, the stored Advice of Charge information is sent out to the mobile station (MS) as represented as a Transmission Of E-parameters (TOE) message shown in FIG. 5. The fact that the mobile station has answered the call is reported from the MSC/VLR to the GMSC using an ISUP answer (ANM) message.

After some time has elapsed in the call, the SCF 54 may determine that the tariff should be changed, e.g., the current time of day indicates a change in rate from the rate in place when the call was set up. As a result, the SCP/SCF sends a charging information message to the GMSC similar to the charging information message of line 2 with the exception that the new Advice of Charge information is included. The GMSC sends the new Advice of Charge information, the GMSC address, and the call reference number to the serving MSC. Since the GMSC knows the address of the serving MSC, the Advice of Charge information, the GMSC address, and the call reference number are provided directly from the GMSC to the serving MSC/VLR in an SS7 control message referred to as a Remote AoC Control message. The serving MSC/VLR then provides the new E-parameters in a Transmission Of E-parameters (TOE) message provide ed to the mobile station. From the initially or subsequently sent TOE message, the mobile station determines the cost of the service in monetary units per time unit as well as an accumulated cost for the current call and displays these (or similar parameters) to the subscriber via the mobile terminal display.

Figure 6:
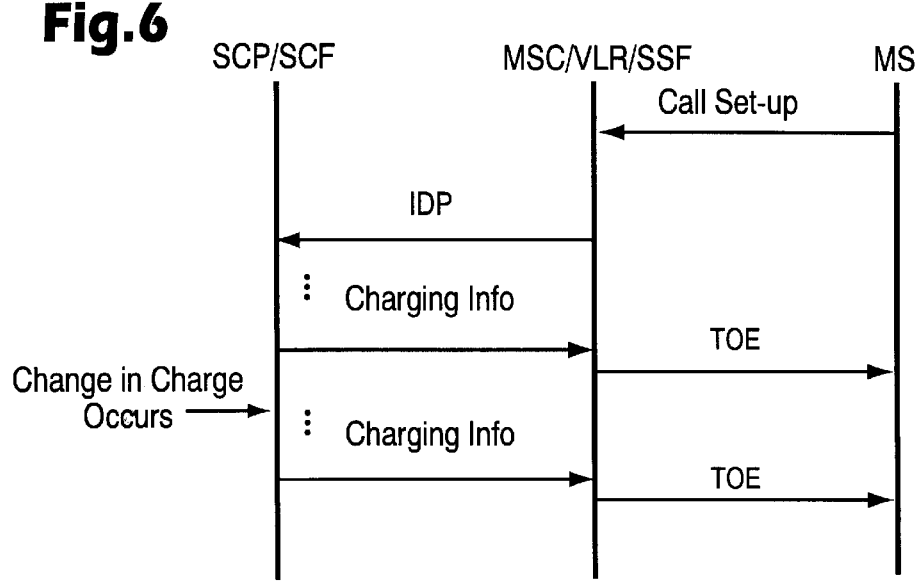
FIG. 6 is a signaling diagram illustrating signaling procedures for implementing the Advice of Charge service for a mobile originated call in the second preferred example embodiment of the present invention.

The AoC service procedures are simplified for a mobile-originated call in this second embodiment as now described in conjunction with the example flow diagram of FIG. 6. The mobile station (MS) originates a call with a call setup message provided to the serving MSC/VLR. A service switching function (SSF) 71 at the serving MSC/VLR determines that the subscriber has an originating IN (CAMEL) based service and invokes the IN functionality. The SSF 71 then sends an initial triggering detection point (IDP) message to the SCP/SCF which contains the identity of the calling mobile subscriber and the dialed destination number. The SCF calculates the tariff of the call based on one or more informational items such as the identity of the calling subscriber, the dialed destination number, the time, the day of the week, and other relevant data. The SCF sends the calculated tariff information as Advice of Charge (AoC) information to the SSF the serving MSC/VLR in a charging information message. Again, the AoC information is sent as additional information in an existing message between the SSF and SCF or in a new message defined to carry this AoC information. The MSC/VLR forwards the received Advice of Charge information to the mobile in a TOE message. If the SCF determines that the tariff has changed, it sends new Advice of Charge information to the SSF 71 in a new charging information message. The serving MSC/VLR forwards the new Advice of Charge information to the mobile station in a new TOE message for display.

In this second, non-limiting, example embodiment, the present invention is implemented by including additional information in existing messages or by creating new messages to provide the Advice of Charge information. In this way, the invention solves the problem described in the background concerning a roaming mobile subscriber currently being served in a visiting network by a visiting MSC where the roaming mobile subscriber is to receive a call. In other words, the visiting MSC currently serving the mobile radio can calculate the total cost of all portions of services employed for the incoming call, including for example, the roaming leg of the call. Advantageously, the advice of charge service is provided without various mobile network operators having to exchange charging/billing information for all mobile subscribers thereby avoiding the enormous administrative tasks of creating and updating a comprehensive charging/billing database.

While the present invention has been described with respect to a particular embodiment, those skilled in the art will recognize that the present invention is not limited to the specific embodiments described and illustrated herein. Different formats, embodiments, and adaptations besides those shown and described, as well as many variations, modifications, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed:

1. A method of providing an advice of charge service to a mobile station, comprising the steps of:
   providing a central control point, coupled to plural mobile switching nodes, configured to perform an administrative charging or tariff analysis function associated with the advice of charge service for each of the plural mobile switching nodes;
   informing the central control point of a call involving the mobile station and the mobile switching node currently serving the mobile station;
   determining at the central control point one or more advice of charge parameters for the call; and
   sending the one or more advice of charge parameters from the central control point to the serving switching node for delivery to the mobile station.

2. The method in claim 1, further comprising:
   determining from the one or more advice of charge parameters a cost of service associated with the call, and
   displaying the cost of service.

3. The method in claim 2, further comprising during the call:
   determining an accumulated cost associated with the call, and
   displaying the accumulated cost.

4. The method in claim 1, wherein the mobile station determines the actual cost of service associated with the call using the one or more advice of charge parameters determined by the central control point.

5. The method in claim 1, wherein the call is originated from the mobile station.

6. The method in claim 5, further comprising:
   initially processing the call originated from the mobile station at a mobile switching center (MSC) currently serving the mobile station;
   the MSC determining that the mobile station has a service controlled by the central control point and informing the central control point of the call and the identity of the serving MSC;
   providing the one or more advice of charge parameters to the serving MSC; and
   the MSC forwards the one or more advice of charge parameters to the mobile station.

7. The method in claim 1, wherein the call terminates at the mobile station.

8. The method in claim 7, further comprising:
   initially processing the call at a gateway mobile switching center (GMSC);
   the GMSC determining that the mobile station has a service controlled by the control point and the identity of a MSC currently serving the mobile station;
   the GMSC informing the central control point of the identity of the mobile station and the serving MSC;
   the central control point sending the one or more advice of charge parameters to the GMSC; and
   the GMSC forwarding the advice of charge parameters to the serving MSC either directly or indirectly through a Home Location Register (HLR).

9. The method in claim 1, further comprising:
   detecting a change in charging condition;
   determining in the central control point a new advice of charge parameter;
   sending the new advice of charge parameter to the mobile station.

10. The method in claim 1, further comprising:
    updating the central control point with information associated with the administrative charging or tariff analysis function.

11. A system comprising:
    plural mobile switching center (MSC) nodes where one of the MSC nodes detects a call involving a mobile station associated with a mobile subscriber having a subscription to an advice of charge subscriber service; and
    a central control node, coupled to the plural MSC nodes and configured to perform for each of the plural nodes an administrative charging or tariff analysis function associated with the advice of charge service, where in response to signals from the one MSC node, the central control node determines one or more advice of charge parameters for the call and provides the one or more advice of charge parameters to the one MSC node for delivery to the mobile station.

12. The system in claim 11, wherein a call originates from a mobile station and is initially processed by the one MSC node, and wherein the one MSC node receives from the central control node and delivers to the mobile station the one or more advice of charge parameters.

13. The system in claim 11, further comprising:
a home location register (HLR) storing subscription information,
wherein a call terminates at a mobile station, and wherein the one MSC node is a gateway mobile switching center (GMSC) that determines with information obtained from the HLR that the mobile subscriber has a service controlled by the central control node and the identity of a second MSC currently serving the mobile station.

14. The system in claim 13, wherein the GMSC informs the central control node of the identity of the mobile subscriber and the second MSC, and thereafter the central control point sends the one or more advice of charge parameters to the serving MSC for forwarding to the mobile station.

15. The system in claim 11, wherein the central control node performs a charging analysis for the mobile subscriber to determine the one or more advice of charge parameters.

16. The system in claim 11, wherein when the central control node detects a change in charging condition, the central control node determines a new advice of charge parameter to be provided to the mobile station.

17. The system in claim 11, wherein a mobile station calculates from the one or more advice of charge parameters a cost of service associated with the call, and displays the cost of service.

18. The system in claim 11, wherein a mobile station calculates from the one or more advice of charge parameters an accumulated cost associated with the call, and displays the accumulated cost.

19. A mobile radio communications system, comprising:
a plurality of MSCs, each MSC coupled to one or more base stations;
a home location register (HLR) storing mobile subscriber location and service subscription information;
a gateway mobile switching center (GMSC), coupled to the plurality of MSCs, receiving a call directed to a mobile station, determining from the HLR that the mobile station has a subscribed service and an identity of the MSC currently serving the mobile subscriber, and generating a service detection message including the mobile subscriber identity; and
a service control point (SCP) receiving the service detection message and determining one or more advice of charge parameters for the call and returns the determined one or more advice of charge parameters to the GMSC for delivery to the serving MSC.

20. The system in claim 19, wherein the GMSC forwards the one or more advice of charge parameters to the serving MSC.

21. The system in claim 19, wherein the GMSC forwards the one or more advice of charge parameters and a call identifier to the HLR which then provides the one or more advice of charge parameters and a call identifier to the serving MSC.

22. The system in claim 19, wherein the mobile subscriber is a roaming subscriber and the serving MSC is in a network other than a home network associated with the mobile station.

23. The system in claim 19, wherein the service control point is an Intelligent Network (IN)-based node including service logic for determining advice of charge parameters, and wherein the GMSC node includes an IN-based service switching function for analyzing calls and detecting when an advice of charge service should be invoked for a particular call.

24. In a mobile radio communications system including plural mobile switching centers (MSCs), each MSC having an associated visiting location register (VLR) and coupled to one or more base stations communicating with mobile radio stations over a radio interface, a home location register (HLR) storing mobile subscriber location and service subscription information, a global mobile switching center (GMSC) connected to the MSCs, and a service control point (SCP), a method comprising the steps of:
receiving in the GMSC a call directed to a mobile station currently registered in a serving one of the MSCs;
the GMSC invoking an Intelligent Network (IN) service switching function that sends an initial trigger detection message to a service control function (SCF) in the SCP;
in response, the SCF determining one or more advice of charge parameters for the call and returning the determined one or more advice of charge parameters to the GMSC;
the GMSC providing the one or more advice of charge parameters to the HLR;
the HLR providing the one or more advice of charge parameters to the serving MSC; and
the serving MSC providing the one or more advice of charge parameters to the mobile station.

25. The method in claim 24, wherein the GMSC provides the one or more advice of charge parameters to the HLR in an information routing request, and the HLR provides the one or more advice of charge parameters to the serving MSC in a roaming number request message.

26. The method in claim 25, further comprising:
after the call is established, sending a new one or more advice of charge parameters from the SCP to the GMSC;
the GMSC forwarding the new one or more advice of charge parameters to the serving MSC; and
the serving MSC providing the new one or more advice of charge parameters to the mobile station.

27. In a mobile radio communications system including plural mobile switching centers (MSCs), each MSC associated with a visiting location register (VLR) and coupled to one or more base stations communicating with mobile radio stations over a radio interface, and a service control point (SCP), a method comprising the steps of:
receiving a call from a mobile station currently registered in a serving one of the MSCs;
the serving MSC invoking an Intelligent Network (IN) service switching function that sends an initial trigger detection message to a service control function in the SCP;
in response, a service control function (SCF) in the SCP determining one or more advice of charge parameters for the call and returning the determined one or more advice of charge parameters to the serving MSC; and
the serving MSC providing the one or more advice of charge parameters to the mobile station.

28. The method in claim 27, further comprising:

after the call is established, sending a new one or more advice of charge parameters from the SCF to the serving MSC;

the serving MSC providing the new one or more advice of charge parameters to the mobile station.

* * * * *